Figure 1:
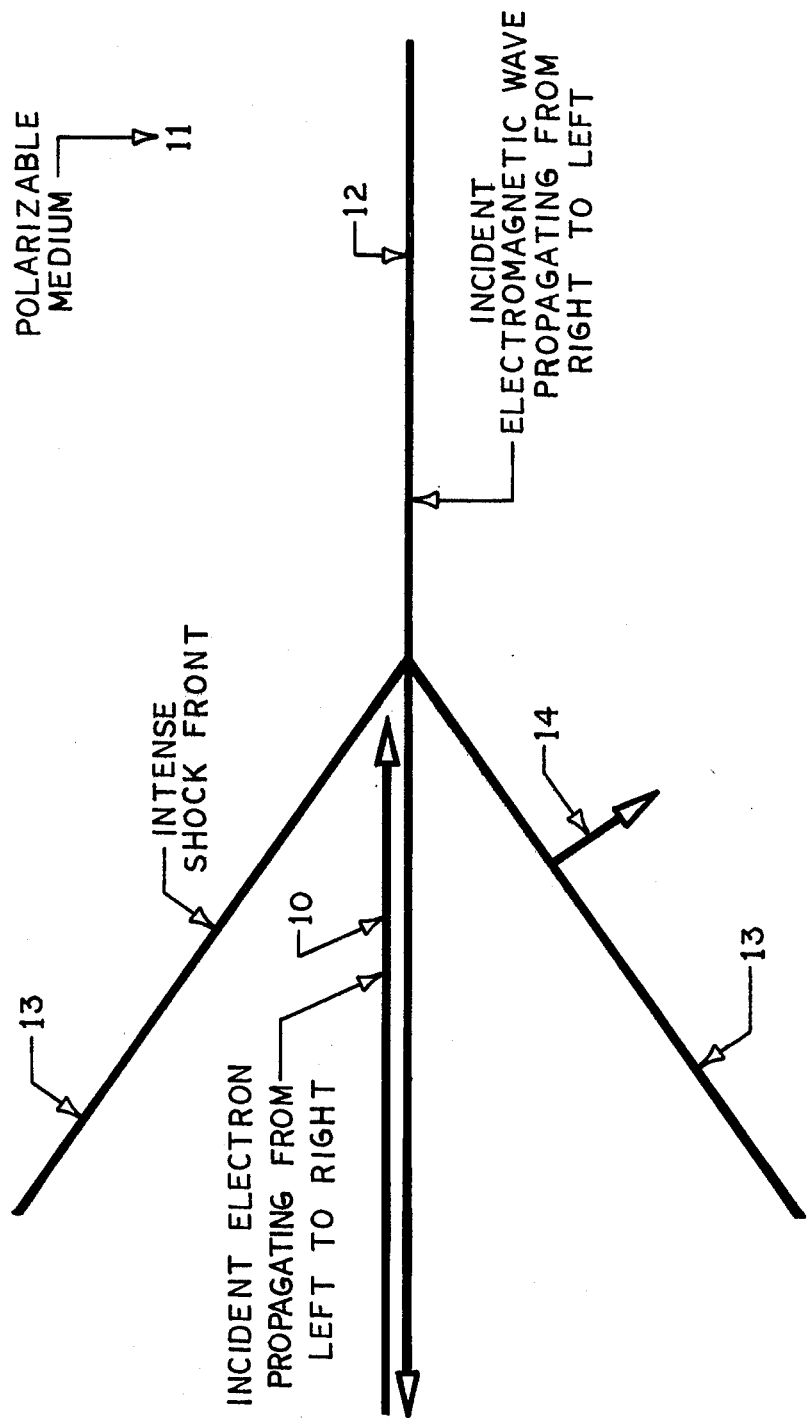

United States Patent [19]

Schneider et al.

[11] 4,109,218

[45] Aug. 22, 1978

[54] METHOD FOR THE GENERATION OF FREQUENCY-TRANSFERRED ELECTROMAGNETIC WAVES

[76] Inventors: Stanley Schneider, 26628 Fond du Lac Rd., Rancho Palos Verdes, Calif. 90274; Richard Spitzer, 2946 Claremont Blvd., Berkeley, Calif. 94705

[21] Appl. No.: 563,178

[22] Filed: Mar. 28, 1975

[51] Int. Cl.$^2$ .......................... H01S 3/30; H01S 3/10
[52] U.S. Cl. ..................................... 332/7.51; 30/4.3; 331/94.5 P
[58] Field of Search .................. 330/4, 4.3, 4.7; 332/7, 332/7.5, 7.51; 331/94.5 PE, 94.5 N, 94.5 C; 250/503, 362, 363, 365; 307/88.3

[56] References Cited

U.S. PATENT DOCUMENTS

| | | | |
|---|---|---|---|
| 3,177,435 | 4/1965 | Marcuse | 330/4 |
| 3,398,376 | 8/1968 | Hirshfield | 331/94.5 PE |
| 3,639,774 | 2/1972 | Wolff | 307/88.3 |
| 3,822,410 | 7/1974 | Madry | 331/94.5 PE |
| 3,879,679 | 4/1975 | Mourier | 331/94.5 N |

*Primary Examiner*—Nelson Moskowitz

[57] ABSTRACT

A method for the controlled generation and amplification of electromagnetic waves and systems utilizing these waves are disclosed. An incident electromagnetic wave of a given frequency stimulates a beam of moving charged particles to radiate in a polarizable medium. The resulting electromagnetic radiation is emitted intensively in highly directional shock waves of narrow-frequency bands about controllable frequencies that are in general substantially different from that of the incident wave. The energy of the radiation so produced can be substantially greater than that of the incident wave. The additional energy is supplied by the moving chaged-particle beam. The method leads to new and novel frequency-transferred wave sources and radiation amplifiers applicable to communication systems, to more efficient laser pumping systems, and to new laser systems, called frequency transducers. These frequency transducers are high-gain sources with controlled frequencies that are highly shifted relative to the initiating frequency.

1 Claim, 4 Drawing Figures

| RESONANCE FREQUENCY OF MEDIUM | SHOCK FREQUENCIES AT EQUILIBRIUM | SHOCK FREQUENCIES FOR INVERTED POPULATIONS |

METHOD FOR THE GENERATION OF FREQUENCY-TRANSFERRED ELECTROMAGNETIC WAVES

The present invention is directed to a method for the controlled production of electromagnetic waves of narrow frequency band and of high spatial directionality and, more particularly, to a method for the production of such waves by the scattering, in a polarizable medium, of monochromatic electromagnetic waves from moving charged particles, with the result that the waves produced are frequency shifted relative to the incident waves. In addition, the present invention relates to the controlled selection of frequencies and wavenumbers and to the controlled modulation, by variation of suitable parameters, of the electromagnetic waves produced by this method. Furthermore, the present invention relates to the establishment of an inverted population in a medium, utilizing electromagnetic waves produced by this method. Further still, the present invention relates to the conversion of electromagnetic waves at a given frequency to waves at a different frequency with a gain in power, utilizing electromagnetic waves produced by this method and a negative-temperature medium.

The frequency band width and spatial localizibility of the waves produced by this method are dictated largely by the degree of monochromaticy of the incident electromagnetic waves, the velocity spread of the charged particles in the incident beam, and the dispersive properties of the medium. It is advantageous, but not essential, for the realization of this method to employ lasers, masers, klystrons or magnetrons as sources of the electromagnetic waves. It is also advantageous, but not essential, to employ electrons as the charged moving particles. Furthermore, although it is sometimes preferable to employ relativistic charged particles in certain media to obtain a particular useful result, there are other media in which the charged particles need not be of relativistic energies for the useful and optimal implementation of the method. Accordingly, it should be understood that reference in this specification to any one of these sources of incident electromagnetic waves, or to charged particles as electrons, or to relativistic electrons is not intended to be restrictive and that such terms are used in the descriptive sense to include any or all such sources or charged particles, when applicable.

The polarizable medium can be a solid, liquid, gas or plasma with either electric or magnetic susceptibility, or both, different from unity and with either isotropic or anisotropic properties and where the anisotropy can be due either to natural geometric factors, for example a crystal structure, or to the introduction of strong directional forces, for example a magnetic force or a pressure wave; or it can be an artificially constructed medium such as a loaded waveguide or cavity in which polarizable components are placed either periodically or randomly but where part of the space remains practically void of any material. Many methods for the construction of such simulated media with specific polarizability characteristics as a function of frequency and/or wavenumber, and for the variation in a controlled manner of these polarizability characteristics are known to those skilled in the art. Furthermore, a medium can be in a state of thermal equilibrium or in a state of negative temperature, that is, a state of nonequlibrium in which the population of a given energy level of a system is larger than that of at least one of the lower energy levels of that system (inverted population).

Throughout this description reference will be made to a medium, and more specifically to a medium in which the charged-particle velocity is greater than or equal to the velocity of electromagnetic energy-momentum transport, herein denoted by $V_{em}$. Accordingly, it should be understood that the term medium is used herein in the descriptive sense to include any or all such cases, when applicable, for which the charged-particle velocity is greater than the velocity $V_{em}$, whether in the presence of an actual material in the region of interest or in a vacuum, and whether in equilibrium or at a negative temperature.

It is characteristic of Compton backscattering of photons from relativistic charged particles that it results in double-Doppler-shifted backscattered photons. The advent of lasers provided sufficient photon intensity for the effect to be observed in laboratory experiments. Such experiments were proposed on theoretical grounds, and conversion of optical photons into gamma rays by Compton backscattering was subsequently observed by scattering laser photons from relativistic electrons.

For a charged particle moving in a given frame of reference with velocity $u$ and interacting with an incident electromagnetic wave of angular frequency $\omega_o$ and wave vector $k_o$, the angular frequency of the radiation scattered in vacuum is given in that frame of reference by $$\omega = \gamma^2 (1 - \beta \cos \theta)(1 + \beta \cos \theta') \omega_o, \quad (1)$$

where $$\beta = u/c, \quad (2)$$

$u$ is the speed of the charged particle, $c$ is the speed of light in vacuum, $$\gamma = (1 - \beta^2)^{-\frac{1}{2}}, \quad (3)$$

$\theta$ is the angle of the vector $k_o$ relative to the direction of $u$, and $\theta'$ is the angle relative to the direction of $u$ of the scattered wave vector $k'$ as observed in the frame of reference in which the charged particle would be at rest in the absence of the incident electromagnetic wave. Thus, the scattered wave has a frequency shift relative to that of the incident wave of $\gamma^2$ times a number of order unity for backscattered waves ($\cos \theta' \simeq 1$) resulting from nearly head-on collisions ($\cos \theta \simeq -1$).

As originally conceived, this effect did not take into account the phase coherence of the incident laser beam at different points in space and time along the electron trajectory; the theory was developed in terms of a single photon interacting with a single charge, thereby losing the phase information in the incident wave. Moreover, the observations of this effect have been confined to the case where it occurs in vacuum. This vacuum effect is not potentially as rich in the kinds of independent phenomena it can lead to as is the corresponding effect in a polarizable medium. Indeed the vacuum effect does not contain the more useful consequences of the coherent-wave nature of an incident electromagnetic source interacting with an electron beam in a polarizable medium. For example, while the frequency of the scattered radiation in the vacuum case is always greater than that of the incident photon, the more so the larger the electron's velocity, the frequency of waves produced in a medium can be higher than, lower than, or even the same as the frequency of the incident electromagnetic wave for specific media and laser and electron-beam parameters. The term frequency-transferred radiation will be used herein for waves produced by the interaction of an electromagnetic wave with an incident electron beam in a medium to include any or all three of these cases when applicable. The frequency transfer of the stimulated scattered waves in the medium is largest for intermediate electron velocities, at which more intense electron beams can be constructed more readily than at ultra-relativistic energies. Further, for example, the scattered radiation in the vacuum case produces radiation of continuously varying intensity at continuously varying angles, with a continuously varying frequency as a function of angle. On the other hand, the scattered radiative energy produced by an electron beam of specific velocity stimulated by the coherent laser in a polarizable medium of specific properties is predominantly emitted at selected angles and at selected sharply peaked frequencies.

Accordingly, an object of the present invention is a method for producing spatially highly directional frequency-transferred electromagnetic radiation by scattering of coherent electromagnetic waves from relativistic charged particles in a suitable medium.

It is characteristic that basically new effects arise when a material body moves in a medium with a velocity that exceeds the velocity of energymomentum transport of the waves it produces in the medium. The basic origin of these effects is apparent from the fact that they manifest themselves in wave phenomena as completely different as acoustic waves and electromagnetic waves.

For a dispersive medium in the non-anomalous regime, in which absorption is low, the velocity $V_{em}$ is approximately equal to the group velocity and depends on the frequency (temporal dispersion) and/or the wavelength (spatial dispersion) of the wave. In a slightly dispersive medium, the group velocity becomes nearly independent of frequency and wavelength.

In the field of hydrodynamics, the basic effect is a shock wave along the Mach cone at supersonic velocities. For a charged particle moving through a medium at constant speed greater than the velocity $V_{em}$ of light in the medium, the effect is Cerenkov radiation. Roughly speaking, the common bond between these diverse effects is that the energy accumulated in the waves cannot get ahead of the moving body that produces these waves, resulting in a wave with a discontinuity, a sharply peaked intensity and a sharply pronounced spatial asymmetry.

The condition for constructive interference in a non-dispersive medium is that the angle $\Psi$ between the electron trajectory and the direction of the emitted wave satisfy the relation $$\cos \Psi = 1/(\beta n), \quad (4)$$

where $n$ is the index of refraction of the waves in the medium. Since $\beta < 1$, the condition for a real angle is that the particle velocity exceed the velocity $V_{em}$ in the nondispersive and nonabsorptive medium. In such a medium, where the group and phase velocities are equal to each other and given by $c/n$, condition (4) is $$u > c/n. \quad (5)$$

When condition (5) is satisfied for an unaccelerated particle, the result is a conical wave propagated with the speed of the charge in the direction of the particle trajectory. This radiation, known as Cerenkov radiation, is emitted at a specific acute angle with respect to the velocity of the charged particle, vanishes outside the Mach cone, is sharply peaked in intensity on the surface of the cone and decreases sharply in intensity away from the inside edge of the cone. Cerenkov radiation is sometimes referred to as electromagnetic shock radiation.

In general, Cerenkov radiation has a continuous frequency spectrum, containing frequency components at all frequencies for which the refractive index satisfies the condition $$n > 1/\beta. \quad (6)$$

It is therefore, in general, not suitable for the generation of monochromatic radiation.

Accordingly, another object of this invention is a method for producing narrow-band frequency-transferred radiation by scattering of coherent electromagnetic waves from moving charged particles in a suitable medium. An overall object of this invention is thus a method for producing narrow-band, spatially highly directed frequency-transferred electromagnetic radiation by scattering of coherent electromagnetic waves from moving charged particles in a medium in which the condition for the formation of a Mach-type effect can be satisfied.

Thus, when conditions are satisfied simultaneously for both frequency-transferred scattering of electromagnetic waves from relativistic charged particles and for a Mach-type phenomenon that arises when the speed of the charged particles in the medium is greater than the speed of the wave produced in the medium, the two phenomena will act synergistically to produce a basically new effect. The degree of coherence of the electromagnetic radiation produced by this mechanism is dictated by that of the incident electromagnetic wave, by the narrowness of the velocity distribution in the electron beam, by the correlations between different electrons in the beam, and by the size and other properties of the polarizable interaction region, which can be optimized by proper design. Because a given fractional spread in the energies of the electrons in the beam translates into a smaller relative spread in velocities at relativistic energies than at nonrelativistic energies, a relativistic electron beam will yield a higher degree of coherence of the scattered wave than a nonrelativistic beam for a given energy spread, other factors being equal.

The qualitative difference in the frequency spectra of the radiation in the Cerenkov effect and in the synergistic effect described herein is characteristic to the fundamental difference in the physical mechanisms underlying these two effects.

It is characteristic of the Cerenkov effect that the time-varying Coulomb field of the incident charge accelerates the polarizable charges in the medium causing these medium charges to radiate. The frequency spectrum of the radiation from the medium charges is thus determined by that of the Coulomb field of the incident relativistic charge. Insofar as the interaction between the incident charge and any given medium charge is concerned, this Coulomb field is equivalent to a pulse of radiation containing all frequencies up to a maximum of the order of $\omega_{max} = \gamma u/b$, where $b$ is the impact parameter for the collision. Because of this spread in the frequencies of the electromagnetic field driving the medium charges and because of the spread in the values of the impact parameter for different medium charges radiating along the trajectory of the incident charge, there will be a correspondingly substantial spread in the frequencies of the Cerenkov radiation from the medium charges.

On the other hand, it is characteristic of and novel to the synergistic effect considered herein that it is the stimulated radiation field of the incident relativistic charge that excites the medium charges. This stimulated radiation field is sharply peaked at the specific transferred frequency of the scattered wave produced by the collision of the incident charged particle with the incident monochromatic electromagnetic wave and is independent of the impact parameters between the incident and medium charges. The preponderance of the resulting radiation from the medium charges is sharply peaked about this specific frequency.

The electromagnetic field radiated by the medium in the form of a shock front when the medium is excited by the frequency-shifted radiation will be referred to herein as stimulated electromagnetic shock radiation. Stimulated electromagnetic shock radiation differs characteristically from electromagnetic shock radiation (Cerenkov radiation), which is produced when the medium radiates solely under the influence of the Coulomb field of the incident charged particles.

The detailed properties of the stimulated electromagnetic shock front of the waves produced by the method of this invention, such as the number of shock cones and the directional angle of each cone, will depend in part on the characteristics of the polarizable medium employed, of the incident electromagnetic wave, and of the charged-particle beam. While examples will be cited below of particular media and of the detailed properties of the stimulated electromagnetic shock radiation produced by the method of this invention in such media, these cited examples and detailed properties are not to be taken as limitations of this method. Rather, they are given for the sake of clarity and definiteness of description.

As an illustration of the type of radiation produced when conditions for the synergistic effect described herein are satisfied, consider the interaction in an unbounded medium between a relativistic electron with an unperturbed speed $u$ in a $z$-direction and an unterminated electromagnetic wave of amplitude $E_o$, angular frequency $\omega_o$ and wave vector $k_o$, incident in the opposite direction. The boundary effects of the medium and the switch-on and switch-off effects of the incident electromagnetic wave are thus neglected in this illustration. Consider further the medium to have unit magnetic permeability, to be homogeneous and isotropic, and to respond linearly to the electromagnetic wave scattered from the incident particle, with the medium properties characterized phenomenologically by a dielectric response function $\epsilon(k, \omega)$.

To leading order in the incident field, the electric field of the stimulated electromagnetic shock radiation is $$\vec{E}(\vec{x}, t) = \frac{-c^2 r_o \vec{E}_o}{\gamma \omega_o (2\pi)^2} \frac{\delta}{\delta t} \int_{-\infty}^{\infty} \vec{dk}\, d\omega \frac{\exp[i(\omega t - \vec{k} \cdot \vec{x})]}{\omega^2 \epsilon(k, \omega) - c^2 k^2} \quad (7)$$

-continued
$$\cdot [\delta(\omega - \vec{k} \cdot \vec{u} - \Omega) + \delta(\omega - \vec{k} \cdot \vec{u} + \Omega)],$$

where $r_o$ is the classical electron radius and $\delta(x)$ is the Dirac delta function. This expression for the scattered field can be evaluated by those skilled in the art to prescribed accuracy for a given functional dependence of the dielectric response function. For the case of an isotropic medium with dielectric properties that vary slowly with $\omega$ and $k$ at the scattered frequency and wavenumber, $\epsilon$ can be approximated by a scalar constant. The Mach-type condition (5) then becomes $\beta^2 \epsilon > 1$ ($\epsilon = n^2$). Expression (7) can then be evaluated exactly to give, in terms of cylindrical coordinates $z$ and $\rho$, $$\vec{E}(\vec{x}, t) = 2 \frac{r_o}{\omega_o} \frac{\gamma_s}{\gamma} \vec{E}_o \frac{\delta}{\delta t} \{H(\tau)H(\gamma_s u \tau - \rho) \cdot \\ \cdot \cos[\Omega(\gamma_s^2 \tau - \frac{z}{u})] \frac{\cos(\alpha Q)}{Q}\}, \quad (8)$$

where $\gamma_s \equiv (\beta^2 \epsilon - 1)^{-\frac{1}{2}}$, $\tau \equiv t - z/u$, $c\alpha = \gamma_s \Omega \sqrt{\epsilon}$, $\Omega = \omega_o(1 + \beta \sqrt{\epsilon})$, $H(x) = 1$ for $x > 0$, and $H(x) = 0$ for $x < 0$, $Q \equiv (\gamma_s^2 u^2 \tau^2 - \rho^2)^{\frac{1}{2}}$ (8a)

The magnetic field associated with the electric field (8) can be obtained in the standard manner from the part of the vector potential whose time derivative gives this electric field.

Expression (8) displays the characteristic features of the synergistic effect described herein: (1) The vanishing of the electric field outside the Mach cone, whose projection on the $z$-$\rho$ half-plane is given by $$z = ut - \rho \sqrt{\beta^2 \epsilon - 1}. \quad (9)$$

(2) An infinite field on the cone. Of course, in a less idealized model of a medium the scattered field is not infinite, but is slightly smoothed out by the dispersive and absorptive properties of the medium and by the collisional energy loss of the particle in the medium due to mechanisms such as ionization. (3) An oscillatory dependence with a transferred frequency given by $\gamma_s^2 \Omega$.

This example also exhibits a feature that is peculiar to the limiting case of a nondispersive medium, namely the existence of a single frequency at which stimulated electromagnetic radiation propagates.

The component $k_z$ of the vector wavenumber for propagation of the scattered wave in the $z$-direction is $k_z = \Omega_s/V_z$, where $\Omega_s = \gamma_s^2 \Omega$ is the corresponding frequency of propagation and $V_z = c/\beta \epsilon$ is the effective velocity of wave motion in the $z$-direction. The quantities $\Omega_s$ and $k_z$ are thereby dictated in part by the electron velocity $u$.

A feature of the present invention is the controlled selection of frequencies and vector wavenumbers of stimulated electromagnetic shock radiation by controlled variation of $u$, of the laser frequency, of the polarizability of the medium, or any of these in combination, and the making of stimulated electromagnetic radiation so selected available for further useful applications.

The specific example cited in the above discussion illustrates the directional nature, peaked intensity and monochromatic double-Doppler-shifted frequency of the electric field of the wave produced by the method described herein for the case of a medium of unit magnetic permeability with slowly varying dielectric response function. This example serves to highlight the capability of the method and is not intended to be restrictive. Referring now to the accompanying drawings, FIG. 1 is a schematic of an illustrative embodiment of the process for producing stimulated electromagnetic shock radiation with reference to this specific example, in which a relativistic electron 10 with an unperturbed speed $u$ interacts in an unbounded medium 11 with an incident unterminated electromagnetic wave 12 of angular frequency $\omega_o$ to produce intense radiation at a transferred angular frequency $\Omega_s$ and with a sharp peak in intensity on a shock front 13 moving with a velocity $V_{em}$ 14.

Expression (7) for the electric field of stimulated electromagnetic shock radiation can be evaluated to specified accuracy, by methods known to those skilled in the art, in the case where the dielectric response function $\epsilon(k, \omega)$ has any prescribed dispersive properties.

The case of a frequency-dispersive medium exhibits some new features. It is characteristic of this case that for a given medium, electron velocity, and frequency of incident wave, stimulated electromagnetic shock radiation can be produced simultaneously in more than one distinct and narrow frequency band, each such band being associated with a narrow band of shock angles. For many practical purposes, each frequency band can be considered as a discrete frequency, and the associated band of shock angles as a discrete shock angle. The stronger the frequency variation of the dielectric, the greater is the number of such shock frequencies. For example, for a medium characterized by several resonant frequencies, the number of shock frequencies will generally be roughly equal to twice the number of resonant frequencies, but some of the frequency bands may coalesce for particular values of the parameters that characterize the medium. The special case of a nondispersive medium corresponds to the situation where all the resonant frequencies are much greater than the transferred frequency. Here the shock frequencies coalesce into the one single frequency given in expression (8a) above. The angle of any given cone of stimulated shock radiation is no longer constrained to be acute in the dispersive case, as it is in the nondispersive case, because the wavefront and direction of the ray of stimulated electromagnetic shock radiation are no longer constrained to be normal to each other as they are in the special case of no dispersion. Moreover, for a dispersive medium, condition (5) need no longer be satisfied for the occurrence of a stimulated electromagnetic shock wave, because the energy of such a wave can propagate in such a medium with a velocity $V_{em}$ that differs from the phase velocity.

The geometric patterns of stimulated electromagnetic shock radiation are made increasingly more complex and richer in detail by the use of media with wavenumber dependance of the polarizability, anisotropic media with attendant tensor polarizabilities, media exhibiting field dependence of polarizability from non-linearities produced by the strong incident laser beams, and by departures from antiparallel incidence of the initial electron beam and electromagnetic wave. The basic method of this invention for generating intense, highly directional narrow-band electromagnetic waves and of controlling their frequencies and amplitudes in these cases is substantially as described earlier in this specification.

The transferred frequency of the stimulated electromagnetic shock radiation is $\gamma_s^2 \Omega$ in the case of a nondispersive medium. For $1 < \beta^2 \epsilon < 2$, the shifted frequency is larger than $\Omega$ and for $\beta^2 \epsilon > 2$ the shifted frequency is smaller than $\Omega$. By suitable variation of $u$ and $\epsilon$, but subject to the relation $\beta^2 \epsilon > 1$ in the nondispersive case, one can transmute a given incident frequency into one of a continuous range of frequencies encompassing that of the incident wave and ranging from substantially higher frequencies for $\beta n \gtrsim 1$ to substantially lower ones for $\beta n >> 1$. Thus, an intense incident monochromatic wave at a frequency readily available in the art can be transmuted by the method of this invention to one at a selectively controlled frequency, either higher or lower than the incident frequency, that is not readily available in the art.

Figure 2:
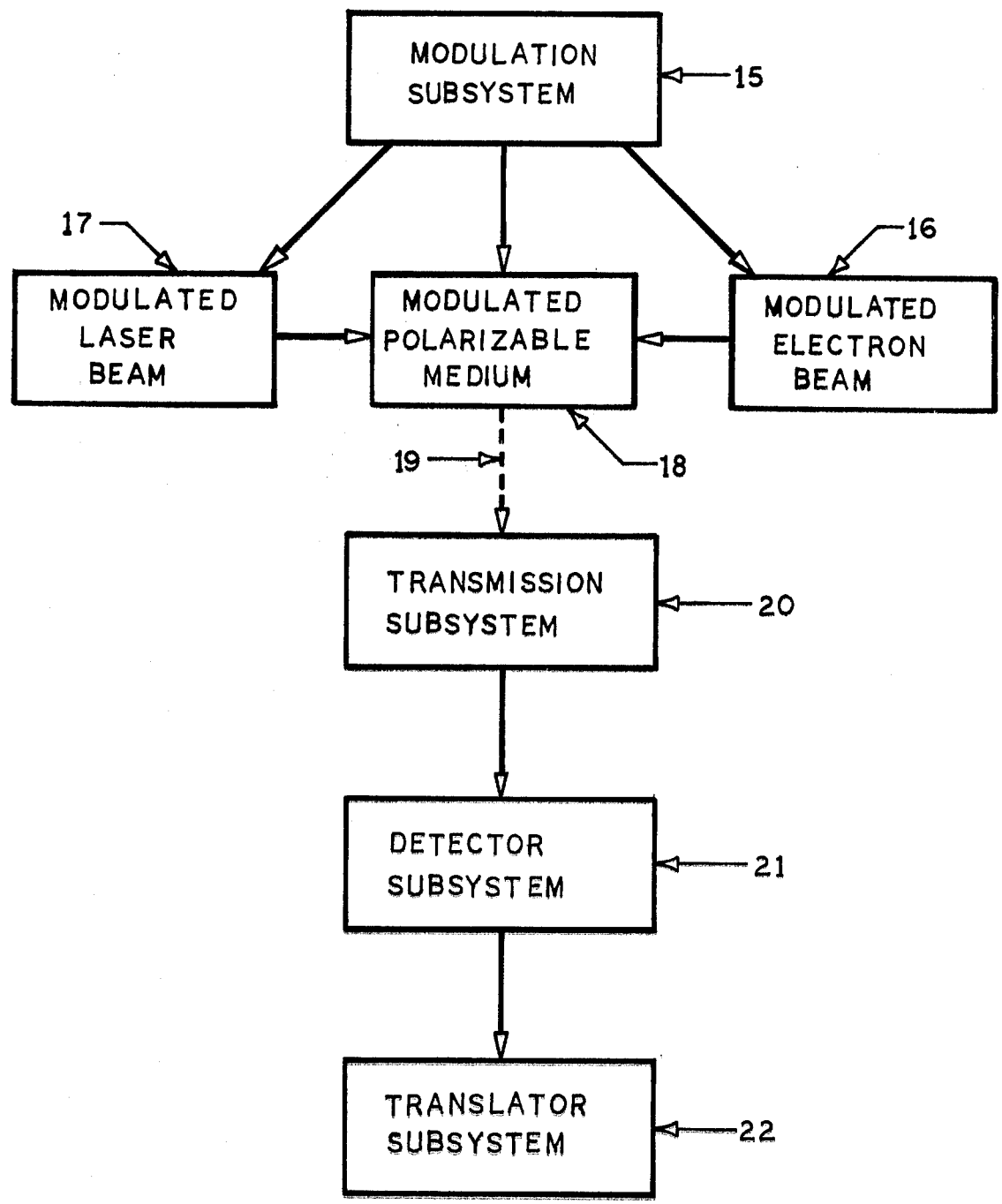

For example, an incident wave at a frequency at which continuous lasers are available, for example infrared or optical, can be transmuted by the method of this invention into a continuous wave at a substantially lower frequency, for example, in the submillimeter regime, or into a substantially higher frequency, for example, in the ultraviolet or even soft x-ray range. Waves in these regimes that can be suitably modulated have application in high-capacity communication systems. The method of this invention for producing intense narrow-band electromagnetic waves provides for fabrication of sources of carrier waves for communication systems at presently unavailable prescribed frequencies. A given required carrier frequency is obtained by the appropriate selection of the incident laser frequency, electron-beam velocity and frequency-wavenumber dependence of polarizability of the medium. A typical communication system comprises frequency-and/or amplitude-modulated electromagnetic waves, a subsystem to introduce information into the controlled modulations, a transmission subsystem to transmit the modulated wave, a detection subsystem to receive the transmitted modulated wave and a subsystem to translate the information into a form that renders it available for further use. All such subsystems and their operation are known to those skilled in the art, but the capability to select sources of electromagnetic waves at any desired frequency with characteristics required for communication systems is presently limited. Referring now to the accompanying drawings, FIG. 2 is a schematic of an illustrative embodiment of such a communication system based on stimulated electromagnetic shock radiation, in which a modulation subsystem 15 introduces information into the electron beam 16, laser beam 17 and/or polarizable medium 18 by suitably controlled modulations; and modulated electron and laser beams interact in said modulated medium to produce an output frequency-transferred modulated wave 19; a transmission subsystem 20 transmits said frequency-transferred modulated wave into a standard detector subsystem 21, and a translator subsystem 22 translates the information received into usable form.

Many methods of modulating in a controlled manner the frequency and amplitude of electromagnetic waves at available laser frequencies are known to those skilled in the art. The term modulated will be used herein for either amplitude modulation or frequency modulation or both, as applicable. Modulation of the incident wave results in a modulated wave at the transferred frequency of stimulated electromagnetic radiation.

Thus, a feature of this invention is the production of modulated electromagnetic waves and making these available for further application, such as in communication systems.

More generally, the characteristics of the frequency and amplitude of stimulated electromagnetic shock radiation and their modulations can be controlled by adjusting the dielectric properties of the medium; by adjusting the average electron velocity, the distribution of electron velocities, the density of the electron beam, and their variations in time; by modulating the incident electromagnetic wave; or by any of these in combination. For example, controlled time variation of the electron-beam velocity and density produces respectively frequency and amplitude modulation of stimulated electromagnetic shock radiation. Many such methods of varying the characteristics of electron beams in a controlled manner are known to those skilled in the art.

Another example of frequency transmutation involves an incident laser wave shifted into higher frequencies, where the method of this invention leads to levels of coherence presently unavailable. At ultraviolet and soft x-ray frequencies known techniques of spectroscopy can be applied, for example, to the study of electron-band spectra of solids and the surface states of crystals. Furthermore, for example, known techniques of diffraction and holography can be applied at x-ray frequencies to the study of the structure of crystals and biological cells such as viruses.

Accordingly, another object of this invention is a method for generating electromagnetic radiation with intensities, with a degree of directionality and of monochromaticity, and with other characteristics, at frequencies and wavenumbers at which electromagnetic radiation with these characteristics is presently not readily available.

Dielectric media with widely diverse properties are readily available, and many methods of controlled adjustment of the polarizable properties of these media are known to those in the art. These include, for example, controlled variation of the pressure and temperature of a medium, use of a medium excited simultaneously by acoustic and electromagnetic vibrations, introduction into the medium of a controlled quantity of an additional species of other polarizable atoms or molecules in varying densities, by construction of artificial media, and by the introduction of strong external perturbations such as magnetic or electric fields. These methods of adjusting the dielectric properties, either by themselves or in conjunction with those methods of modulating stimulated electromagnetic shock radiation that were considered earlier in this specification, result in further complex and potentially useful modulation properties of this radiation.

The use of empty structures loaded with polarizable material in the vicinity of the voids in such a manner as to allow passage of the electron beam and electromagnetic waves without appreciable collisions with the polarizable medium itself, where such structures are compatible with frequency and wavelength considerations, has the specific advantage that the beam will not suffer undue energy losses, with an attendant loss of speed and decrease of effective interaction length, and the electromagnetic waves will not suffer undue absorption. The use of such artificial media thus enhances the output capability of this method. Employment of such artificial dielectric media for the production of stimulated electromagnetic shock radiation is particularly advantageous in applications where a high degree of monochromaticity, spatial directionality and phase coherence is desired, such as in the communications field.

Another example of application of this invention is the production and further utilization of negative-temperature media. In this connection, one is led to consider the energy difference between two different levels of a medium and the frequency which is equal to some particular such difference divided by the universal Planck's constant; such a frequency will be referred to herein as a transition frequency. Electromagnetic radiation will invert the energy-level population of a medium which it traverses provided its frequency is greater than or equal to an appropriate transition frequency and this medium is capable of supporting an inverted population. A system for preparing a negative-temperature medium comprising an incident electron beam, an incident electromagnetic wave, a medium in which the incident beam and wave interact to produce stimulated electromagnetic shock radiation, and a medium capable of sustaining an inverted population will be referred to herein as a system for pumping by stimulated electromagnetic shock radiation. The medium in which the negative temperature is produced by this method can be the same medium as the one in which the shock radiation is produced, or it can be different from it. For example, the shock radiation can be produced in a different sample of the same kind of medium as that being pumped, the two media can be of different types, or one sample of a medium can serve both for production of shock radiation and as the medium being pumped. One of the frequencies of stimulated electromagnetic shock radiation can in general be adjusted to correspond to an energy which on the one hand is sufficiently larger than the energy difference between two of the levels in the medium in which population inversion is to be achieved to avoid appreciable absorption, but which on the other hand is sufficiently close to this energy difference to be highly effective in causing transitions between these two levels. Either the higher of these two levels and/or some intermediate level that is subsequently populated by fast transitions from the higher level can be the one in which a nonequilibrium population distribution is established with respect to a suitably separated lower level. Similarly, there can be established in the lower of these two levels a nonequilibrium population distribution with respect to a suitably separated higher energy level. In general, the pumping frequency need not be the same as the transition frequency corresponding to the two levels with respect to which population inversion is established. Such pumping at a selected frequency of stimulated electromagnetic shock radiation is substantially more efficient than the state-of-the-art techniques of collisional transfer and flash or electron-beam excitation because of the enhanced nature of the interaction of an electromagnetic wave tuned to a frequency close to resonance with the medium frequency. This pumping technique thereby provides for a more efficient design of laser systems at frequencies that are higher or lower than that of the incident laser and at which narrow-band sources are presently unavailable. It is characteristic of and novel to this pumping technique that the frequency of the incident wave in a system for pumping by stimulated electromagnetic shock radiation need not itself be resonant with the pumping frequency, but rather that the pumping-frequency electromagnetic wave results from the coupling of several elements of this system and is therefore produced by the system itself.

Accordingly, another object of this invention is the use of stimulated electromagnetic shock radiation tuned near to a transition frequency of a medium to establish an inverted population in this medium.

Moreover, a system for pumping by stimulated electromagnetic shock radiation exhibits a synergistic effect above and beyond the one that results only in stimulated elecrromagnetic shock radiation. As the populations of the two levels with respect to which inversion is to be achieved begin to change, the dielectric properties of the medium being pumped change specifically.

The frequency dependence of the complex electrical susceptibility of a medium in a state of thermal equilibrium is specifically different from that of a state in nonequilibrium. For a medium at thermal equilibrium, and which is characterized by one or more transition frequencies, the contribution to the real part of the electrical susceptibility, which determines the dispersive properties of the medium, from a given virtual transition is positive for frequencies below the transition frequency and is negative for frequencies above the transition frequency. The imaginary part of the susceptibility, which determines the absorptive characteristics at thermal equilibrium, is peaked at the transition frequency and falls off for frequencies receding in either direction from that transition frequency. As the populations of the two energy levels corresponding to this transition frequency begin to change from a state of thermal equilibrium toward a state of inverted population, the absorptive properties diminish and approach zero as the two levels become approximately equally populated. As the population of the higher energy level becomes greater than that of the lower energy level, the absorptive characteristics become converted into a potential gain associated with the energy stored in the negative-temperature medium, and this potential gain increases as the population inversion becomes more pronounced. The dispersive characteristics of the medium also change as the level population becomes inverted, the contribution from the virtual transition in question to the real part of the susceptibility for frequencies above the transition frequency becoming positive and that for frequencies below the transition frequency becoming negative. These characteristic differences in the nature of the response of a dielectric medium to an electromagnetic wave of given frequency, which arise for different population distributions of the energy levels, are decisive to the additional enhancement, due to the additional synergism referred to above, of pumping by stimulated electromagnetic shock radiation.

Figure 3:
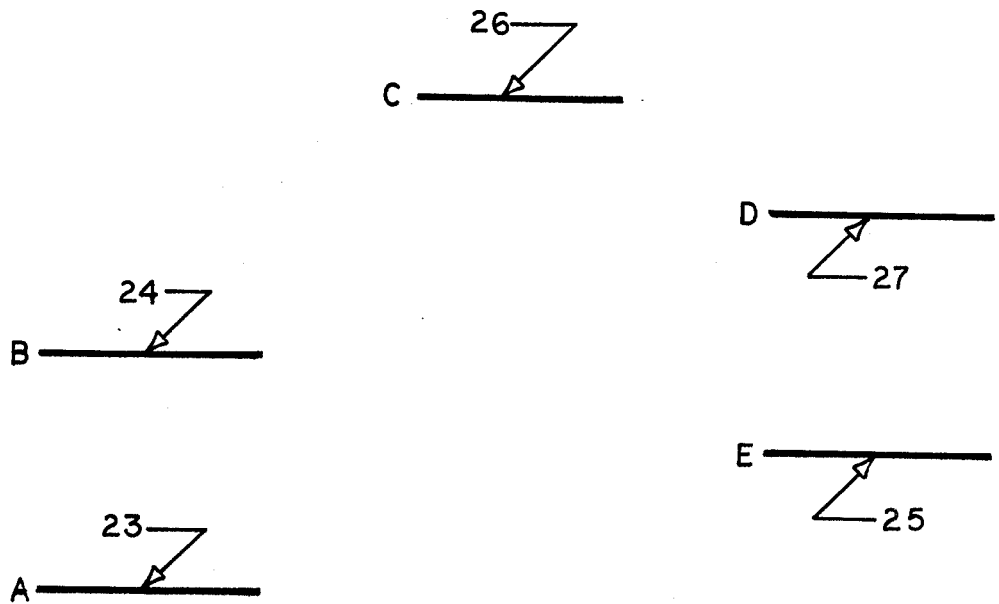

One particular illustrative embodiment of such an enhanced system for pumping by stimulated electromagnetic shock radiation comprises a system for pumping by stimulated electromagnetic shock radiation in which the medium capable of sustaining an inverted population is of the same type as the one in which the incident electron beam and the incident electromagnetic wave interact to produce this radiation, with the medium having at least five energy levels, denoted by A, B, C, D, and E, with a metastable level D intermediate in energy between a higher energy level C and a lower energy level E and with the medium initially in thermal equilibrium. With suitable choices of the incident electromagnetic wave and of the incident electron beam, stimulated electromagnetic shock radiation will be produced at a frequency intermediate between two adjacent transition frequencies of the medium, close to the lower of these two transition frequencies but sufficiently distant from either transition frequency so that the absorption is not excessive. With the higher of these two transition frequencies denoted by $\nu_1$, corresponding to the energy levels A and B, the lower of these two transition frequencies denoted by $\nu_2$, corresponding to the energy levels C and E, and the frequency of the stimulated electromagnetic shock radiation denoted by $\nu_S$, these frequencies satisfy the relationship $\nu_1 > \nu_S > \nu_2$ at thermal equilibrium. The shock radiation then causes transitions between the two energy levels C and E, resulting in a nonequilibrium population of these levels. In addition, a stimulated electromagnetic shock wave will also be formed at a frequency $\nu_R$, with $\nu_R < \nu_2$. The wave component $\nu_R$ is not nearly as efficient at thermal equilibrium as the frequency component $\nu_S$ in causing the transition from E to C, because it has not sufficient photon energy to produce the transition by one-photon exchange. As the process of inversion progresses, the changing polarizability characteristic of the medium will cause the frequency $\nu_R$ to change and approach ever more closely to the transition frequency $\nu_2$. When the component $\nu_R$ of stimulated electromagnetic shock radiation becomes equal to $\nu_2$, this component can produce the transition from E to C by one-photon exchange. In addition, the frequency component $\nu_S$ still produces the transition from E to C. The pumping efficiency of the radiation is thereby enhanced substantially by the resulting resonance effect as $\nu_R$ becomes approximately equal to $\nu_2$, and by the simultaneous decrease in medium absorption as the populations of the two levels C and E tend to equalize. Furthermore, as the populations of these two levels are equalizing, there is established in energy level C a nonequilibrium population distribution with respect to the intermediate energy level D. Furthermore, a fast spontaneous transition from level C to the intermediate metastable level D will produce an inverted population between level D and some lower level, which for simplicity will be taken here as the energy level E. The inverted population between energy levels D and E is now available for use in a stimulated-emission lasing system in the usual manner. In general, the frequency corresponding to the two levels with respect to which population inversion is established will be different from that of the incident wave that initiates production of stimulated electromagnetic shock radiation. The system thus stores a large amount of energy that is potentially available for release in the form of an electromagnetic wave at a frequency very different from that of the incident electromagnetic wave, for example at an x-ray frequency, with the stored energy having been supplied partly by the incident electromagnetic wave but predominantly by the incident electron beam. It is characteristic of this system for producing a negative-temperature medium that it becomes more efficient as the populations of the two levels corresponding to the pumping frequency equalize. Referring now to the accompanying drawings, FIG. 3 is a schematic of the energy levels of an illustrative embodiment of such a pumping system based on stimulated electromagnetic shock radiation, in which said radiation is produced at a frequency $\nu_S$, which at thermal equilibrium is smaller than the transition frequency $\nu_1$ between the two levels A 23 and B 24 but larger than the transition frequency $\nu_2$ between the two levels E 25 and C 26, and also at a second shock frequency $\nu_R$, which is smaller than $\nu_2$ at thermal equilibrium; the shock radiation of frequency $\nu_S$ causes transitions between the two energy levels C and E, causing the polarizability characteristics of the medium to change in such a way that the shock frequency $\nu_R$ changes and approaches the transition frequency $\nu_2$ and thereby allows radiation of said changed frequency $\nu_R$ to produce transitions from level E to level C; as the population of level C increases and a nonequilibrium population of level C is established with respect to the metastable state D 27, spontaneous transitions from level C to level E produce an inverted population with respect to level D and E and thereby make said inverted population available for conventional lasing process.

Accordingly, a feature of this invention is a system for pumping by stimulated electromagnetic shock radiation, the medium being pumped having polarizability properties that change specifically as a result of the change of energy-level populations from thermal equilibrium so as to enhance substantially the efficiency of pumping by stimulated shock electromagnetic radiation.

Stimulated electromagnetic shock radiation produced in or incident upon a negative-temperature medium prepared by whatever means is greatly amplified if at least one of the shock frequencies is adjusted to correspond closely to the energy difference between two separated levels with respect to which population inversion has been established. When so adjusted, stimulated electromagnetic shock radiation efficiently causes transitions downward in energy between the inverted-population levels, thereby releasing the energy stored in the negative-temperature medium and producing a wave of much greater intensity than the incident electromagnetic wave. As the radiation is being produced at the transition frequency, it stimulates further emission at the same frequency, due to the usual lasing mechanism, causing greater intensities yet. A system for releasing the energy stored in a negative-temperature medium comprising an incident electromagnetic wave, an incident electron beam, a medium in which the incident wave and beam interact to produce stimulated electromagnetic shock radiation, and a negative-temperature medium will be referred to herein as a frequency transducer. A characteristic and novel feature of releasing energy stored in a negative-temperature medium by means of such a frequency transducer is that the frequency of the incident electromagnetic wave need not itself match the transition frequency between the inverted-population energy levels, but rather that the transition-frequency electromagnetic wave results from the coupling of several elements of this system and is therefore produced by the frequency transducer itself.

Figure 4:
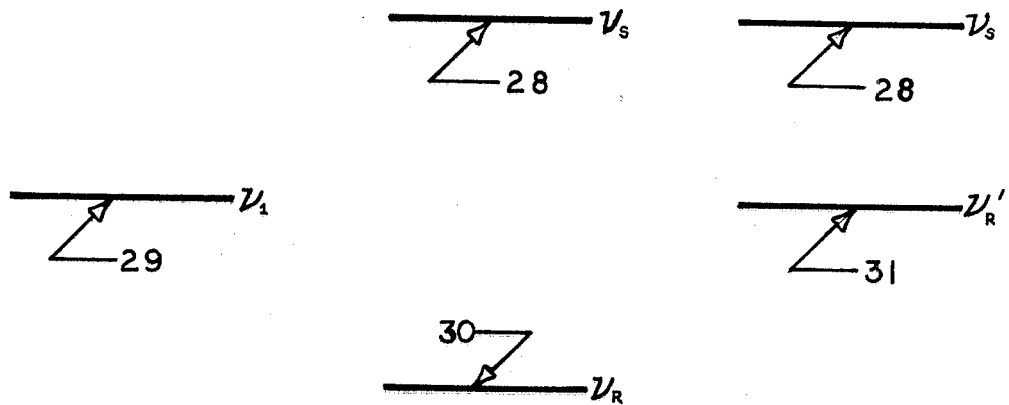

A particular illustrative embodiment of such a frequency transducer comprises an enhanced system for pumping by stimulated electromagnetic shock radiation of the kind described above, wherein one of the shock frequencies is adjusted to correspond closely to the difference between the two energy levels with respect to which population inversion has been established. This frequency transducer produces energy in the form of a coherent or quasi-coherent electromagnetic wave at a transferred frequency, with high gain relative to the energy of the incident electromagnetic wave that initiated the process by colliding with the incident electron beam. A high-gain frequency transducer is thus provided for. Referring now to the accompanying drawings, FIG. 4 is a schematic of a medium resonance frequency and shock frequencies of an illustrative embodiment of such a frequency transducer based on stimulated electromagnetic shock radiation, in which shock radiation at frequency $\nu_S$ 28 greater than a resonance frequency $\nu_1$ 29 of a polarizable medium, corresponding to two specific energy levels of said medium, produces by pumping an inverted population with respect to same said two energy levels, and a second shock frequency $\nu_R$ 30, which is less than $\nu_1$ at thermal equilibrium, changes so as to come into near resonance at $\nu'_R$ 31 with $\nu_1$ when the populations of said two energy levels become nearly equal, thereby stimulating resonant transitions from the upper to the lower of said two energy levels while radiation at frequency $\nu_S$ is still efficiently repopulating the higher of said two energy levels.

Accordingly, another object of this invention is a transducer with large gain, utilizing a negative-temperature medium and stimulated electromagnetic shock radiation which supplies energy in the form of an electromagnetic wave at a frequency that can be vastly different from the frequency of the electromagnetic wave characterizing the system that actuates the transducer.

The various specific examples cited in the above discussion illustrate the novelty, generality and utility of the invention described herein. These examples serve to highlight the capabilities of this invention and are not intended to be restrictive.

What is claimed is:

1. A method for generating highly directional frequency-transferred electromagnetic waves of narrow frequency band encompassing a specific controllable frequency, said method comprising,
    adjusting the frequency of an incident electromagnetic wave of narrow frequency band, the properties of an incident beam of moving electrically charged particles, and the polarizability characteristics of a polarizable medium capable of supporting electromagnetic shock radiation at the frequency of said generated waves, to values required to produce said generated radiation at said specific transferred frequency,
    bringing said incident electromagnetic wave and said incident charged particles together in said medium so as to cause said incident wave to stimulate by acceleration said charged particles to radiate in said medium
    utilizing said medium to reradiate electromagnetic waves at said transferred frequency and to focus said generated waves in specific directions,
    and making said generated waves available for further application.

* * * * *